UNITED STATES PATENT OFFICE.

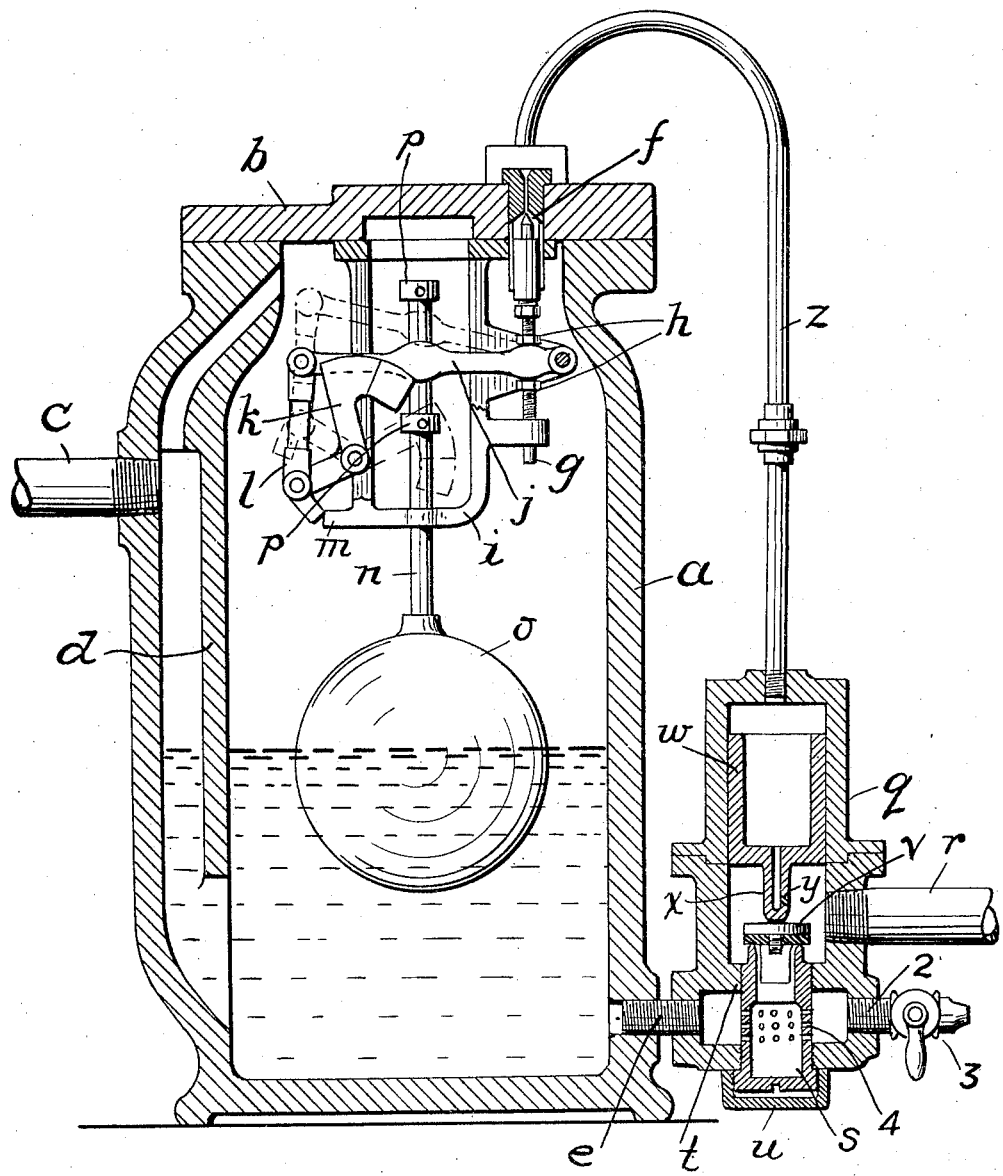

LOUIS R. MERTENS, OF PHILADELPHIA, PENNSYLVANIA, ASSIGNOR TO CHARLES J. MILLER, OF PHILADELPHIA, PENNSYLVANIA.

STEAM-TRAP.

1,362,954.  Specification of Letters Patent.  Patented Dec. 21, 1920.

Application filed December 29, 1919. Serial No. 347,882.

*To all whom it may concern:*

Be it known that I, LOUIS MERTENS, a citizen of the United States, residing at Philadelphia, county of Philadelphia, and State of Pennsylvania, have invented a new and useful Improvement in Steam-Traps, of which the following is a full, clear, and exact description, reference being had to the accompanying drawings, which form a part of this specification.

My invention relates to steam traps of the type designed to collect and condense high or low pressure exhaust.

The object of my invention is to provide a trap in which the exhaust will be caught and condensed and which will be cleared, automatically, upon the water of condensation reaching a predetermined level, by means of a pilot valve which is positively moved and held in open and closed position during the filling and clearing of the trap respectively.

A further object of my invention is to provide means controlled by the pilot valve to permit the opening of a valve, which will allow the trap to clear itself under the influence of the contained pressure, and to close the valve and retain it in closed position, upon the trap being cleared. The valve and the means controlling it are so arranged that the valve need not be balanced or compensated and will be opened wide and closed instantly.

Another object of my invention is to provide such an arrangement of the mechanism that the steam used in actuating the valve will be exhausted into the discharge of the trap and not into the atmosphere and to provide means whereby any sediment in the trap will be collected and means to blow out such sediment independent of the discharge of the trap.

A further object of my invention is to so arrange the various parts that they may be readily removed from the trap body for adjustment or replacement.

I will now describe my invention in detail with reference to the accompanying drawings, in which I have illustrated a preferred embodiment thereof and in which,—

The figure is a vertical sectional view of a steam trap embodying my invention.

A tank $a$, which may be cylindrical or other convenient form, is provided with a removable head $b$. Near the top of the tank is an inlet pipe $c$, having opposite to it a deflector $d$ extending downward to near the bottom of the tank. Near the bottom on the opposite side of the tank is a discharge pipe $e$.

Fitted in the head $b$ is a needle valve $f$, the adjustable stem $g$ of which has threaded thereon spaced apart nuts $h$.

Secured to the under side of the head $b$ is a hanger $i$. One end of a lever $j$ is pivoted to the hanger adjacent the valve stem $g$ and extends between the spaced nuts $h$. A weighted lever $k$ is pivoted to the hanger at a point opposite to and below the pivot point of the lever $j$. A link $l$ is pivotally connected to the levers and extends to a point slightly below its connection with weighted lever $k$ to be in operative relation with stop $m$ on the hanger.

The lever $j$ and the cross member of hanger $i$ are provided with holes through which extends the stem $n$ of the float $o$. On the stem $n$ are secured adjustable stops $p$, $p$, which limit the up and down movement of the float.

Adjacent the tank $a$ and in communication therewith, through discharge pipe $e$, is a casing $q$ made in two sections and provided with a discharge pipe $r$. A valve cage $s$ is threaded into an aperture in the bottom of the casing and through a partition $t$, which forms a valve chamber between the inlet of casing $q$ and its discharge pipe. A cover $u$ is threaded on the lower end of the cage outside of the casing, while a disk valve $v$ seats on the upper end of the cage and is adapted to afford or shut-off communication between the inlet and discharge. The cage is perforated to form a strainer 4 to strain the water passing through valve $v$ and collect any sediment.

The upper part of casing $q$ serves as a cylinder in which works piston $w$ provided with a hollow extension $x$ in communication with the cylinder and having a vent $y$, forming a connection between the piston head and the disk valve $v$. A pipe $z$ connects the needle valve $f$ with the head of the cylinder.

A pipe 2 provided with a valve 3 is placed in the casing below the partition $t$ and on a line with the inlet to permit the blowing out sediment from the trap and valve chamber.

In operation, the exhaust, entering the tank through inlet c, strikes the baffle plate and is contained and condensed. As the level of the condensate rises in the tank, the float rises and, at a predetermined level, the lower stop p strikes lever j and lifts it and the weighted lever k, through link l. As soon as the weighted lever k is lifted over center it falls, throwing lever j up and closes needle valve f. When the needle valve closes, communication between the cylinder and tank a through pipe z is cut off and the pressure in the cylinder passes out through the vent y, in the piston, into the discharge pipe. The pressure in tank a acting on the under side of the disk valve will then force it open and the contents of the trap will be discharged through discharge pipe r.

As the level in casing a drops, the float drops. When the upper stop p on the float stem contacts with lever j, the lever is drawn down and the valve opened. Steam then passes to the cylinder and forces piston w down, closing the disk valve through the connection x.

It will be observed that the strainer, disk valve and cage may be readily removed from the casing q for repair or replacement and that the needle valve and its actuating mechanism may be readily removed from the casing a with the removal of head b.

Having now fully described my invention, what I claim and desire to protect by Letters Patent is:—

1. A control valve for draining a steam trap of the water of condensation, having a casing, an open ended tubular casing inserted through the end wall of the casing separating the valve casing into two chambers and forming a closure for the valve casing, a valve for said seat, a water inlet to one chamber, a water outlet from the other chamber, there being openings through the wall of the tubular chamber to permit water to pass thereto from the inlet chamber, said tubular casing forming a strainer for straining the water passing from the inlet chamber to the outlet chamber, and valve actuating means in the outlet chamber.

2. A control valve for draining a steam trap comprising a casing having a piston chamber in one end, a piston movable in said chamber, an outlet pipe leading from said cylinder, there being an inlet chamber in the other end of the casing, an inlet pipe leading thereto, an open ended tubular casing extending through both walls of the inlet chamber into the cylinder, there being strainer openings through the wall of the tubular casing, the end of the tubular casing opening into the cylinder having a valve seat formed thereon, and a valve arranged to be moved to its seat by the piston.

3. In a steam pipe, the combination with a tank having an inlet and a water outlet, a chamber communicating with said outlet having an opening in its top and bottom, a strainer extending through the bottom opening and also through the top opening and forming above the chamber a valve seat, a valve engaging said seat, and a discharge pipe beyond said valve, said strainer being removably secured in position, whereby, when the strainer is removed, the valve may also be removed through said openings.

4. A trap having an inlet, an outlet for water and an outlet for steam, a control device comprising a casing, a hollow valve member having a valve seat, said member being inserted through an opening through the wall of the casing, there being a connection between the trap water outlet and the interior of said member, there being a piston chamber in said casing, a connection from the piston chamber to the steam outlet from the trap, a discharge leading from the piston chamber, a piston in the piston chamber between the steam inlet and the discharge, a valve for said seat controlled in one direction by the piston, and means for controlling the admission of steam to the piston chamber from the trap.

5. A trap having an inlet, an outlet for water and an outlet for steam, a control device comprising a casing, a hollow valve member having a valve seat, said member being inserted through an opening through the wall of the casing, there being a connection between the trap water outlet and the interior of said member, there being a piston chamber in said casing, a connection from the piston chamber to the steam outlet from the trap, a discharge leading from the piston chamber, a valve in the piston chamber arranged to engage the seat to shut off the flow of water from the trap through the valve member to the piston chamber, a piston in said chamber between the valve and the steam inlet to the piston chamber and arranged to force the valve to its seat, and means to control the admission of steam from the trap to the piston chamber.

6. A trap having an inlet, an outlet for water and an outlet for steam, a casing, a partition dividing the casing into upper and lower parts, a connection between the lower part of the casing and said water outlet, a piston in the upper part of the casing, a connection between said steam outlet and the part of the casing above the piston, a water outlet from the upper part of the casing below the piston, a removable hollow valve seat in said partition, and a loose valve above the valve seat and below the piston, the bottom of the casing having an opening through which said valve seat and valve are removable.

7. A trap having an inlet, an outlet for water and an outlet for steam, a casing, a partition dividing the casing into upper and lower parts, a connection between the lower part of the casing and said water outlet, a piston in the upper part of the casing, a connection between said steam outlet and the part of the casing above the piston, a water outlet from the upper part of the casing below the piston, a removable hollow valve seat in said partition, and a loose valve above the valve seat and below the piston, the bottom of the casing having an opening and the valve seat extending through the lower part of the casing and closing said opening, both the valve seat and valve being removable through said opening.

In testimony of which invention, I have hereunto set my hand at Philadelphia, Pa., on this 26th day of December, 1919.

LOUIS R. MERTENS.